(No Model.) 3 Sheets—Sheet 2.
H. T. C. KRAUS.
PROCESS OF AND APPARATUS FOR EXTRACTING OIL.
No. 569,208. Patented Oct. 13, 1896.
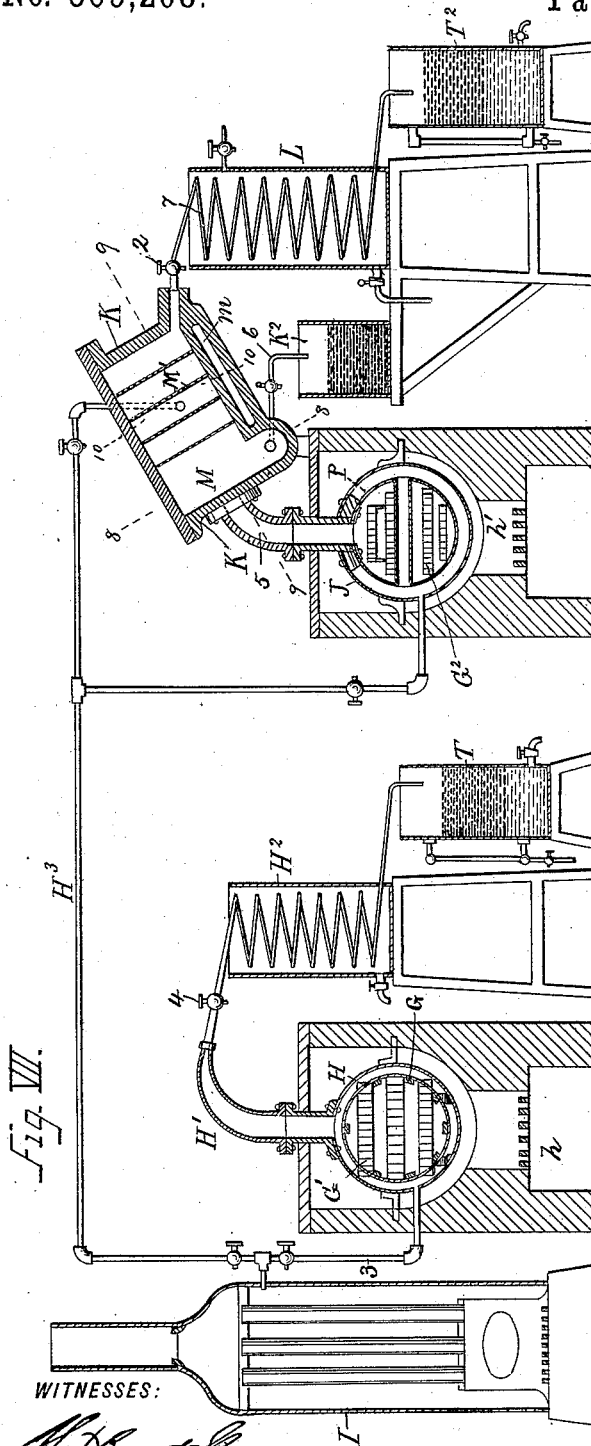
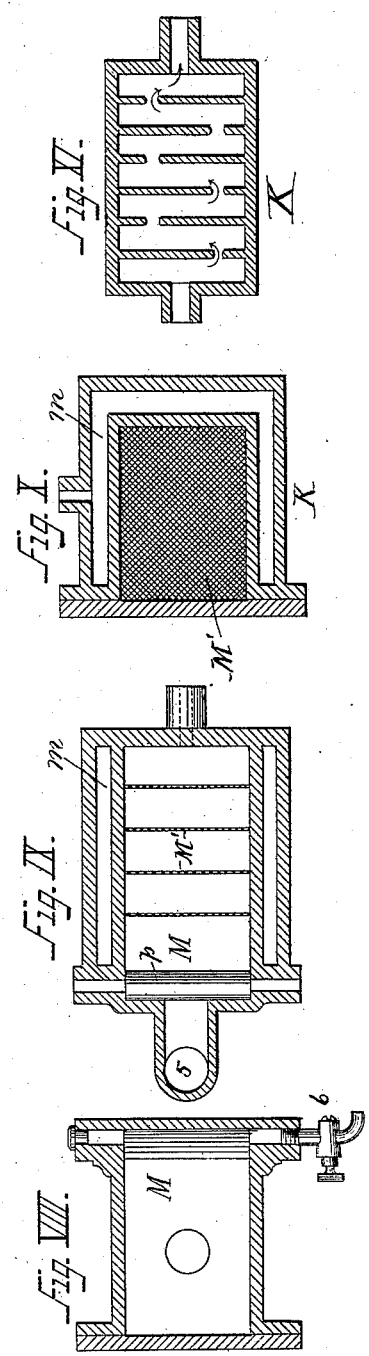
WITNESSES:
INVENTOR
Herman T. C. Kraus
BY
Francis C. Bowen
ATTORNEY.

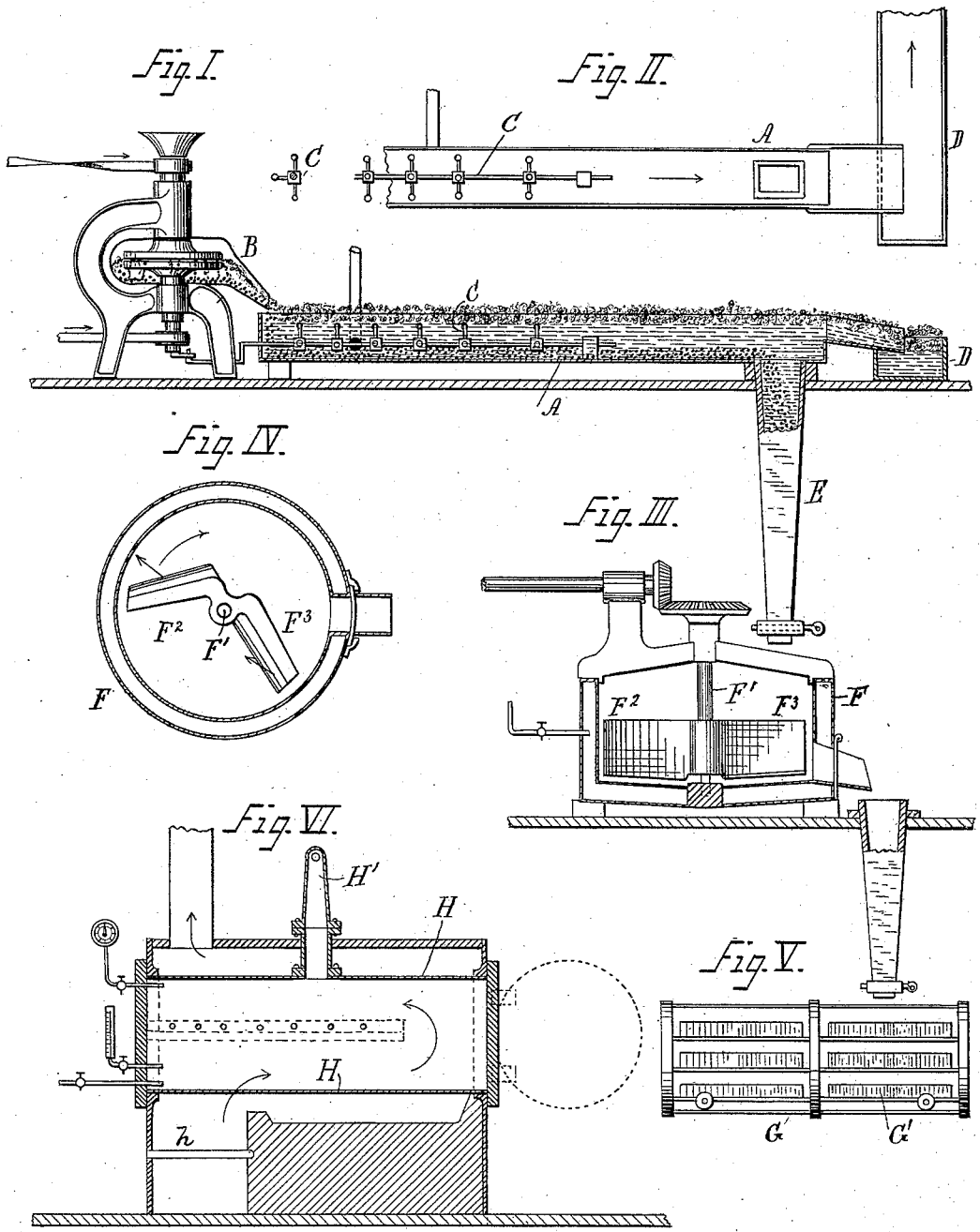

(No Model.) 3 Sheets—Sheet 3.
H. T. C. KRAUS.
PROCESS OF AND APPARATUS FOR EXTRACTING OIL.
No. 569,208. Patented Oct. 13, 1896.
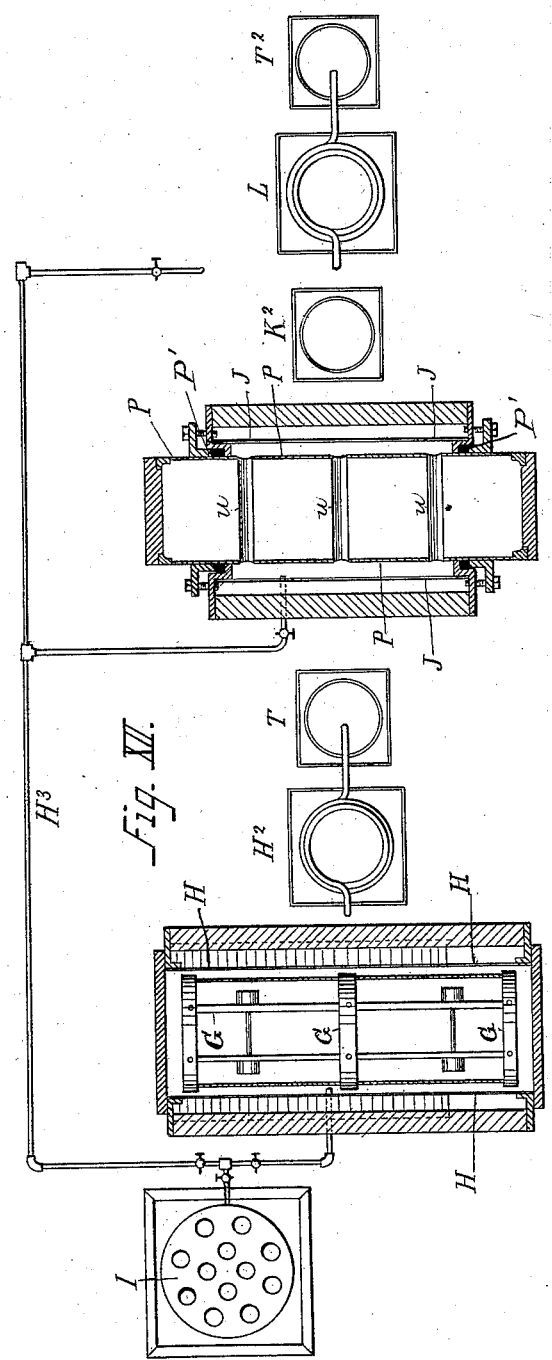
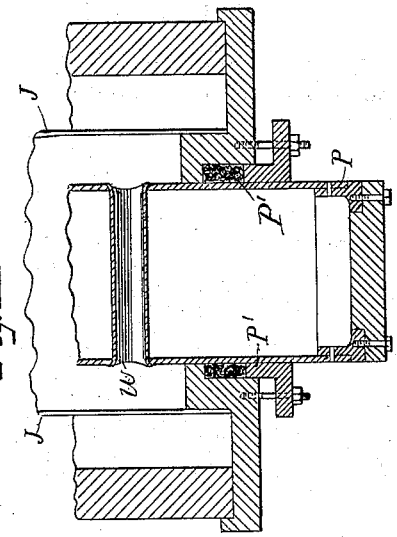
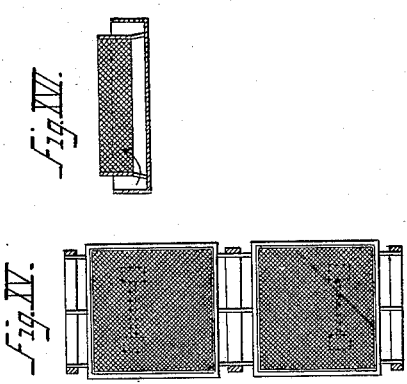
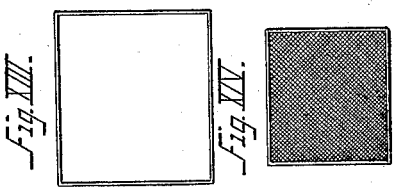

UNITED STATES PATENT OFFICE.

HERMAN T. C. KRAUS, OF BROOKLYN, NEW YORK.

PROCESS OF AND APPARATUS FOR EXTRACTING OIL.

SPECIFICATION forming part of Letters Patent No. 569,208, dated October 13, 1896.

Application filed October 11, 1895. Serial No. 565,400. (No model.) Patented in England October 25, 1895, No. 20,107.

*To all whom it may concern:*

Be it known that I, HERMAN T. C. KRAUS, a citizen of the United States, and a resident of Brooklyn, in the county of Kings and State of New York, have invented certain new and useful Improvements in the Process of and Apparatus for Extracting Oil from Vegetable-Seeds, &c., (for which I have obtained a patent in Great Britain, No. 20,107, bearing date October 25, 1895,) of which the following is a specification.

My invention relates to the process of and apparatus for extracting oil from vegetable seeds or substances; and it has for its object to increase the amount of oil which may be extracted from the material being treated as compared with the processes now in vogue, to reduce the length of time required for such extraction, as well as the amount of labor involved, and to improve and cheapen the apparatus whereby the process is carried into effect.

In the accompanying drawings I have illustrated an apparatus whereby my improved process may be carried into effect; but I do not wish to be limited to the particular apparatus shown, as the invention may be carried out by means of other forms of apparatus.

In such drawings, Figure 1 is an elevation, partly in section, of the separating-trough forming part of such apparatus; and Fig. 2 is a plan view of a portion thereof. Fig. 3 is a sectional elevation of the agitator, and Fig. 4 a horizontal section of the same. Fig. 5 is a side view of a carrier for the pans or vessels which contain the material being treated. Fig. 6 is a longitudinal vertical section of the heating apparatus in which the carrier shown in Fig. 5 is placed. Fig. 7 is a sectional elevation of the apparatus by means of which the oil is extracted from the seed or other material in which it is originally contained. Fig. 8 is a cross-section of the retainer K, taken on the line 8 8 of Fig. 7. Fig. 9 is a longitudinal section of the same, taken on the line 9 9 of Fig. 7. Fig. 10 is a cross-section of the same, taken on the line 10 10 of Fig. 7. Fig. 11 is a longitudinal section of a form of retainer different from that illustrated in the figures just described. Fig. 12 is a horizontal section of the apparatus illustrated in Fig. 7. Fig. 13 is a top plan view of the tray for carrying the material. Fig. 14 is a plan view of a wire pan. Fig. 15 is a longitudinal horizontal section of the carrier illustrated in Fig. 5 with the pans or trays in place. Fig. 16 is a cross-sectional view of the pans or trays illustrated in Figs. 13 and 14, one being within the other. Fig. 17 is a central horizontal section, enlarged, illustrating the method of supporting and mounting the cylinder P.

Referring to Fig. 1, A represents a trough into which the seeds or other material from which the oil is to be extracted are received through a spout B from a hulling or other mill, which need not be herein described in detail. In the lower part of this trough there is an agitator C, and it is provided with means whereby it is supplied with flowing water or other liquid. As the disintegrated seeds pass through the trough a separation or cleaning takes place, the lighter hulls floating off with the water to a trough D, while the kernels settle and are delivered through a discharge-spout. This spout is shown as delivering to an agitator F, which is shown as consisting of a jacketed cylinder or tub in which is mounted a vertical shaft provided with arms which are so arranged that upon the shaft being revolved one of the arms has the tendency to propel the substance in the tub in an outward direction, while another of the arms tends to propel it in an inward direction, at the same time lifting the substance. This agitator operates to reduce the kernels to a finely-divided or paste-like condition, in which condition the material is well suited for the subsequent treatment to which it is subjected.

A steam or water pipe is shown as entering the space surrounding the tub or vessel of the agitating device, through which steam or hot water may be delivered in order to maintain the material at a suitable temperature while being broken up or disintegrated. From this agitating device the oil-bearing material is delivered to a series of pans or containing vessels G', which I prefer to mount in a skeleton frame G.

H is a cylinder or steam-tight vessel into which the frame G, carrying the pans which contain the mass of oil-bearing materials, is introduced. It is mounted in a furnace or heater *h* and has a steam pipe 3, leading from a boiler or steam-generator I into its lower portion. An outlet or escape pipe H', provided with a valve 4, leads out from the cylinder H and continues as a coil through a condenser or cooler H² and terminates in a collecting vessel or tank T.

h' represents another furnace or heater, in which is mounted a double-cylinder or steam-tight vessel, the outer cylinder or jacket being represented by J and the inner cylinder by P. Into the space between these two cylinders there leads a steam-pipe H³, and a pipe 5 connects the interior of the inner cylinder P with an apparatus or device K, which I term the "retainer." There is no communication between the interior of the cylinder P and the space within the cylinder J, surrounding it.

The retainer consists of a structure or vessel of any suitable form or construction, but preferably jacketed, as indicated at m, so that the interior chamber may be maintained at the desired temperature, and in which chamber there are mounted a number of obstructing plates or partitions M'. These are preferably constructed of perforated metal or wire-gauze fabric, although they may be of imperforate plates, arranged as shown in Fig. 11. This retaining device serves to retain or catch the heavier parts of the oily or fatty matter which pass from the cylinder P through the pipe 5 into the chamber of the retaining device along with vapor of water and the lighter or volatile portions of oily matter, as will be presently described in stating my improved process. For the purpose of better retaining such oily or fatty matter the retainer is preferably arranged in an inclined position, as shown, so that the liquid material which collects therein will flow into the lower part of the chamber, whence it may be drawn off through a pipe 6 into a suitable receiver K². The pipe 5 enters the lower part of the retaining-chamber, and an exit or escape pipe 7, provided with a valve 2, leaves such chamber at its upper part and continues as a coil through the cooler L and terminates in a tank or receiving vessel T².

The material which is treated within the cylinder P is placed in pans or receiving vessels G², which are preferably imperforate, and in order that the material within this cylinder may be the more readily acted upon by the heat of the surrounding atmosphere within the cylinder J such inner cylinder is crossed by a number of open-ended pipes or flues u. (Shown in Figs. 7, 12, and 17.) Great difficulty has been experienced in keeping the joints in the cylinder P, around the pipes u and 5, steam-tight, and in order to permit the cylinder to be repaired with ease whenever these become leaky I mount the inner cylinder so that it may be easily removed and another cylinder put in its place. This I effect by making the cylinder P somewhat longer than the cylinder J, and I provide the end walls or plates of the outer cylinder with glands or stuffing-boxes P', (see Figs. 12 and 17,) which surround the inner cylinder and prevent leakage at these points. Whenever an inner cylinder is found to be leaky, the gland-boxes are loosened or removed, and this permits the inner cylinder to be easily slipped out of the outer cylinder, when another cylinder may be put in its place.

My process may be now described, and I will describe it as it is generally practiced by me when treating cotton-seed, it being understood that various modifications of the process will be made in treating other seeds or substances, as will be apparent to those skilled in the art.

The kernels of the seed having been freed to a great extent from their hulls in the trough A are conveyed to the agitator or pulverizing device F, Fig. 3, where they are reduced to a finely-subdivided or paste-like condition. While being treated in this device, they are mixed with water, and to this there may be added, if found necessary, a suitable acid or a caustic soda, the purpose of which is to destroy the hulls or other woody or fibrous materials which may have passed on with the kernels to the agitator.

The kind of acid or alkali used and the proportional amount employed will depend upon the kind of seed being treated and the relative freedom of the kernels from the hulls, and therefore I need not herein state definite proportions, as they will be readily determined by those skilled in the art. In treating cotton-seed the amount of sulfuric acid will be from five to twenty per cent. of the volume of water, depending upon the kind of seed and the length of treatment. If caustic soda is used, from five to eight per cent. by weight would be sufficient.

The material having been reduced to sufficiently fine particles is placed in pans or trays, and these, supported in a frame, like that at G, Fig. 5, are introduced into a steam-tight cylinder or vessel H, where they are subject to the action of saturated steam of about sixty pounds pressure to the square inch. It is essential to the proper working of my process that the steam should be maintained in a saturated condition while acting upon the oil-bearing materials in the cylinder H, and to insure the steam being maintained at the proper temperature I arrange, in combination with the cylinder H, a suitable heating device or furnace, as indicated at h. If the steam be superheated while in the presence of the material in the vessel H, or if it be permitted to cool below the point of saturation, the process is impaired. When the steam first enters the cylinder H, the cock 4 is closed, so that there is no flow of steam through the cylinder at first. This condition continues—the steam being maintained as dry, saturated, but not superheated steam by the heater h—until the fatty matter contained within the kernels has expanded into a lard-like mass, this requiring usually but a few minutes.

After this treatment has continued a sufficiently long time, the cock 4 is opened and the steam allowed to rush through the cylinder H, taking with it both the water which was mixed with the oil-bearing material when introduced into the cylinder and the loose, expanded, fatty parts of the oil-bearing material, leaving the trays or vessels G' practically empty. Some of the oily or fatty parts of the material introduced into the cylinder H may be carried on with the steam as a vapor, but most of the oily or fatty matter is taken up and carried on with the steam in small particles or globules as it violently passes through the cylinder. The vapors from the cylinder H condense in the coil of the exit-pipe in the cooler $H^2$, and the entire mass of aqueous and oily matter is discharged into the receiver or tank T, where a separation takes place, the water at the bottom and the fatty matter on top.

The oily or fatty matter which collects in the receiver T, after being separated from the water, is placed in vessels and these inserted into the cylinder P, where the material is subjected to a second treatment. The separation between the water and the fatty matter in the vessel T is never perfect, and it is essential to my process that the fatty matter which is introduced into the second treating-cylinder P should contain a certain amount of water mixed with it, this amount being, however, less than the amount of water mixed with the oil-bearing material when first treated in the cylinder H. When the treatment of the fatty material in the cylinder P is begun, the cylinder is closed by means of the cock 2 and the contents heated until a pressure of thirty pounds or more is developed, and this is maintained for a few minutes. The space between the two cylinders P and J is filled with an atmosphere and tightly closed. I prefer to use steam as such atmosphere, though ordinary air may be employed, or other suitable vapor.

The direct action of fire or other heating means in the furnace $h'$ maintains the atmosphere surrounding the inner cylinder P at the proper temperature, usually from 600° to 700° Fahrenheit. The heat of the fire being applied to the inner cylinder indirectly through the confined atmosphere surrounding such cylinder prevents unequal heating of the contents of the cylinder or the burning or scorching of parts of its contents, as would occur were the heat applied directly. The tubes $u$, extending through the inner cylinder, facilitate the rapid and uniform heating of the material being treated. When this treatment of the fatty matter has continued for a sufficiently long time, usually but a few minutes, the cock 2 is opened and the material contained in the pans or trays $G^2$ is carried out of the cylinder P through the escape-pipe 5 into the retaining device K, the vapor of water and the volatile parts of the fatty or oily matter which was treated passing readily through the partitions M', within the retainer, and out through the pipe 7, where they are condensed in the cooler L and finally collect in the tank or receiving vessel $T^2$. The oily particles which are not vaporized, but are carried on by the rush of the vapor from the cylinder P when the cock 2 is opened, are intercepted by the plates M' and collect as an oil in the retaining device K, draining into the chamber or portion M thereof, whence they may be removed through the pipe 6 as pure cotton-seed oil, provided cotton-seed be the material being treated. The material which collects in the vessel $T^2$ is water and the finer or lighter grades of the oil, and these finally separate and are drawn off from the vessel independently.

It will be understood that the cylinder P is not completely emptied of vapor when the cock 2 is opened and the contained vapors and fatty material allowed to pass into the chamber K, but the greater portion of the material is carried on at such time. After the charge in the cylinder P has been discharged as perfectly as may be done, in the manner just described, I usually blow through the cylinder for a short time live steam which may be supplied through the pipe $h''$. (Shown in dotted lines.)

The oil which collects in the vessel $K^2$ may be subjected to a similar treatment in the cylinder P to that just described if a further purification and refinement is necessary, and this may be repeated as often as found necessary.

After the valve or cock 2 has been opened and the material within the cylinder P allowed to escape, as far as it will escape, it will be found that there still remains in the pans or trays $G^2$ a residuum consisting of some fibrous material and heavy oily or fatty matter. This is removed and may be discarded as waste material or again mixed with water and retreated if found desirable.

As has been stated, it is necessary that the material treated in the cylinder P should be in the presence of water, as it prevents the scorching or burning of the fatty or oily matter and insures that the oily material shall be carried on into the separator or retainer K, when the pressure within the cylinder P is removed and the contents of the pans or trays allowed to vaporize.

It will be observed that my process consists, essentially, of two principal steps or subprocesses, one being that described as carried on in the cylinder H and the other that carried on in the cylinder P. These processes may, however, be used independently, although it is preferable that they should be used successively, as I have described, as a complete process.

It will be observed that an essential feature of my process of extracting oil, whether carried out in one of the subprocesses or the other, is the treating of the oil-bearing material while in the presence of water by heat and under pressure, and that another feature of my invention is the separation of the fatty or oily matter from the fibrous material or other impurities by reducing the pressure after the material has been treated, as just set forth, a sufficient length of time, allowing the fatty and oily material to be carried on with the vapor of water to a suitable separating device or devices.

Having thus described my invention, what I claim, and desire to secure by Letters Patent, is—

1. In the art of extracting oil, the herein-described process, to wit: mixing the oil-bearing material with water, subjecting this mixture to the action of heat, and a relatively-high pressure, whereby the vaporization of the water is prevented, then relieving the pressure and allowing the water to rapidly vaporize and pass off, carrying with it the oily or fatty material, and then separating the materials which pass off from each other, substantially as set forth.

2. In the art of extracting oil, the herein-described process, to wit: mixing the oil-bearing material with water, subjecting the mixture to the action of saturated, but not superheated, steam, at about sixty pounds pressure, then allowing the steam to flow through the chamber in which the material being treated is contained, and then collecting and separating the materials which pass off from such chamber, substantially as set forth.

3. In the art of extracting oil, the herein-described process which consists in subjecting the oil-bearing material to the action of saturated steam at a high pressure, such material being mixed with water, maintaining such pressure until the oily or fatty matter expands and separates from the materials with which it was associated, and then relieving the pressure, whereby there is a flow of steam through the chamber in which the material is contained, and the vaporous and the oily or fatty parts of the material being treated are carried on with the flowing steam, and subsequently separating the material so carried on, substantially as set forth.

4. In the art of extracting oils, the herein-described process, which consists in subjecting the oil-bearing material to the action of saturated steam at a high pressure, the material being mixed with water during such treatment, maintaining the pressure in the chamber containing the material for a sufficient length of time, and at the same time maintaining the steam in a saturated, but not superheated, condition by external heat, then relieving the pressure and causing a flow of the steam through the chamber, and finally separating the material carried on with the flowing steam, substantially as set forth.

5. In the art of extracting oil, the herein-described process, to wit: subjecting a mixture of fatty or oily material and water to a high degree of heat and pressure while in a closed vessel or chamber, maintaining the heat and pressure a sufficient length of time, then relieving the pressure from the chamber or vessel, allowing the water in the mixture to vaporize rapidly and pass off, carrying with it oily matter, and finally collecting and separating the materials which escape therefrom, substantially as set forth.

6. In the art of extracting oil, the herein-described process, to wit: subjecting a mixture of the oily or fatty matter and water to a heat approximately 600° Fahrenheit, and a corresponding degree of pressure, in a closed chamber or vessel, maintaining such heat and pressure by the indirect application of heat to such vessel, then relieving the pressure within such chamber or vessel, and finally collecting and separating the materials which escape therefrom, substantially as set forth.

7. In the art of extracting oils, the herein-described process, which consists in treating the oil-bearing material while mixed with water to the action of saturated steam at a relatively high pressure, maintaining such heat and pressure a suitable length of time, then relieving the pressure and permitting the steam to flow through the chamber containing such materials to carry with it the vapor of water and the oily or fatty matter, separating the oily or fatty matter from a portion of the water, then subjecting this material to a high degree of heat and pressure in a closed vessel, maintaining such heat and pressure a sufficient length of time, relieving the pressure from such material, permitting the vapors and oily matter to escape therefrom, and separating the oily from the vaporous material which so escapes, substantially as set forth.

8. The combination of the outer cylinder J, arranged to be closed steam-tight, external means for applying heat to such cylinder, another cylinder P, arranged to be closed steam-tight, such latter cylinder being smaller in diameter, and longer than the cylinder J, and supported in the ends thereof, and the glands or stuffing-boxes P', secured to the heads of the cylinder J, and surrounding the cylinder P, whereby the latter is removably supported within the outer cylinder, substantially as set forth.

HERMAN T. C. KRAUS.

Witnesses:
MAX. BURGESS,
WM. E. KLINE.